(12) United States Patent
Whitehead, Jr. et al.

(10) Patent No.: US 8,290,901 B2
(45) Date of Patent: Oct. 16, 2012

(54) TECHNIQUES FOR REMOTE RESOURCE MOUNTING

(75) Inventors: William Robert Whitehead, Jr., Sandy, UT (US); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 550 days.

(21) Appl. No.: 11/073,797

(22) Filed: Mar. 7, 2005

(65) Prior Publication Data

US 2006/0200473 A1    Sep. 7, 2006

(51) Int. Cl.
  *G06F 7/00*  (2006.01)
  *G06F 17/00*  (2006.01)
  *G06F 17/30*  (2006.01)
(52) U.S. Cl. .................... 707/620; 707/687; 707/705
(58) Field of Classification Search .................. None
  See application file for complete search history.

(56) References Cited

U.S. PATENT DOCUMENTS

| | | | |
|---|---|---|---|
| 4,887,204 A | 12/1989 | Johnson et al. | |
| 5,363,487 A * | 11/1994 | Willman et al. | 710/8 |
| 5,721,948 A | 2/1998 | Duncan | |
| 5,778,384 A | 7/1998 | Provino et al. | |
| 5,832,505 A * | 11/1998 | Kasso et al. | 707/104.1 |
| 5,978,815 A | 11/1999 | Cabrera et al. | |
| 5,987,471 A | 11/1999 | Bodine et al. | |
| 6,078,929 A * | 6/2000 | Rao | 1/1 |
| 6,115,549 A | 9/2000 | Janis et al. | |
| 6,144,959 A * | 11/2000 | Anderson et al. | 707/9 |
| 6,421,684 B1 * | 7/2002 | Cabrera et al. | 707/802 |
| 6,516,416 B2 * | 2/2003 | Gregg et al. | 726/8 |
| 6,735,692 B1 | 5/2004 | Murphrey et al. | |
| 6,847,968 B2 | 1/2005 | Pitts | |
| 7,124,133 B2 * | 10/2006 | Yamauchi et al. | 707/10 |
| 2001/0037337 A1 * | 11/2001 | Maier et al. | 707/101 |
| 2003/0009476 A1 * | 1/2003 | Fomenko et al. | 707/103 R |
| 2003/0028508 A1 * | 2/2003 | Quinlan | 707/1 |
| 2006/0004684 A1 * | 1/2006 | Kime | 707/1 |
| 2008/0313728 A1 * | 12/2008 | Pandrangi et al. | 726/12 |

* cited by examiner

*Primary Examiner* — Loan T Nguyen
(74) *Attorney, Agent, or Firm* — Schwegman, Lundberg & Woessner, P.A.

(57) ABSTRACT

Techniques for remote resource mounting are provided. A login resource logs into a network. During the login, a mounting specification associated with the login resource is acquired. The mounting specification defines how a remote resource is to be locally mounted on a local device of the login resource. The mounting specification is communicated to a mounting service, which processes on the local device of the login resource and which locally mounts the remote resource on the local device.

11 Claims, 3 Drawing Sheets

TECHNIQUES FOR REMOTE RESOURCE MOUNTING

FIELD

The invention relates generally to networking and more particularly to remote mounting of network resources.

BACKGROUND

In distributed client/server environments, administrators often have difficulty defining a user's home directory and then defining how that home directory is made available to other computers and systems that the same user might access. A user's home directory can be local to the computer that the user is logged into or it can be a mount point to a remote file system that actually hosts the real home directory for the user.

Existing remote file system or directory mounting takes one of two approaches. In a first approach, a customized script is installed as a local file on a user's machine. The customized script identifies where to mount the user's home directory from. With this technique, any changes to a user's home directory within the network necessitate that the user's machine be visited and that a new customized script be installed thereon.

The second approach uses a generic script referred to as an automount service or script. The automount service uses a file which is obtained from a remote database. Current databases support Lightweight Directory Access Protocol (LDAP), Network Information System (NIS), Hesoid, and a local file system. The file contains map data which will instruct the automount service on how to mount the user's home directory. The automount service is more generic than the customized script approach; however, the automount script approach still requires modification on the user's local device to install the initial file that identifies the remote service and also requires modification if the remote service is changed to a different remote service. The automount service can also be started by the user typing in the correct command sequence.

Moreover, both existing mounting techniques are implemented as separate and distinct processes from a user's network login. That is, a user logs into a network through one service and then another service (customized script or automount script) executes in order to mount the user's network home directory. This means that a variety of information must be physically managed and maintained on user machines and also managed on one or more locations which are external to the user machines.

Thus, improved techniques for remote resource mounting are needed.

SUMMARY

In various embodiments, a login resource logs into a network. During the login session, a mounting specification is acquired for the login resource. The mounting specification is communicated to a mounting service that locally mounts a remote resource defined by the mounting specification on a local device of the login resource.

DETAILED DESCRIPTION

A "resource" as used herein refers to a directory, a data store, a service, a device, a user, an application, or various combinations of the same. For example, one resource may be a directory mount point for another resource which is a user. Additionally, a resource may be a group associated with a set of selective users. A "login resource" is a particular type of resource that includes an interface for logging into a network. Thus, a login resource may be a user, a group of users, a device, an automated application, and/or an automated service.

A "service" can be an application, system, and/or script which are adapted to execute on a processing device or machine. A service or a resource may be remote with respect to another service or resource when the two services or resources a geographically dispersed from one another over a network. Similarly, a service or resource is local to another service or resource when the two services or resources process within the same environment or on the same machine. Accordingly, the terms "remote" and "local" are relative designations, such that these designations may change depending upon the circumstances.

Various data structures are also described and used herein and below. Some data structures are referred to as "specifications." A specification may refer to policies or statements that define rules or procedures. Other data structures are referred to as "objects." An object may include attributes, which identify features of the object, and may include methods, which identify services or operations that may be exercised against or through the object.

Various embodiments of this invention can be implemented in existing network products and services. For example, in some embodiments, the techniques presented herein are implemented in whole or in part in the iChain®, Border Manager®, eDirectory®, and/or SuSE® LINUX products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, directory of file system services, and/or identity services. Any particular architectural layout or implementation presented herein is provided for purposes of illustration and comprehension only and is not intended to limit aspects of the invention.

Figure 1:
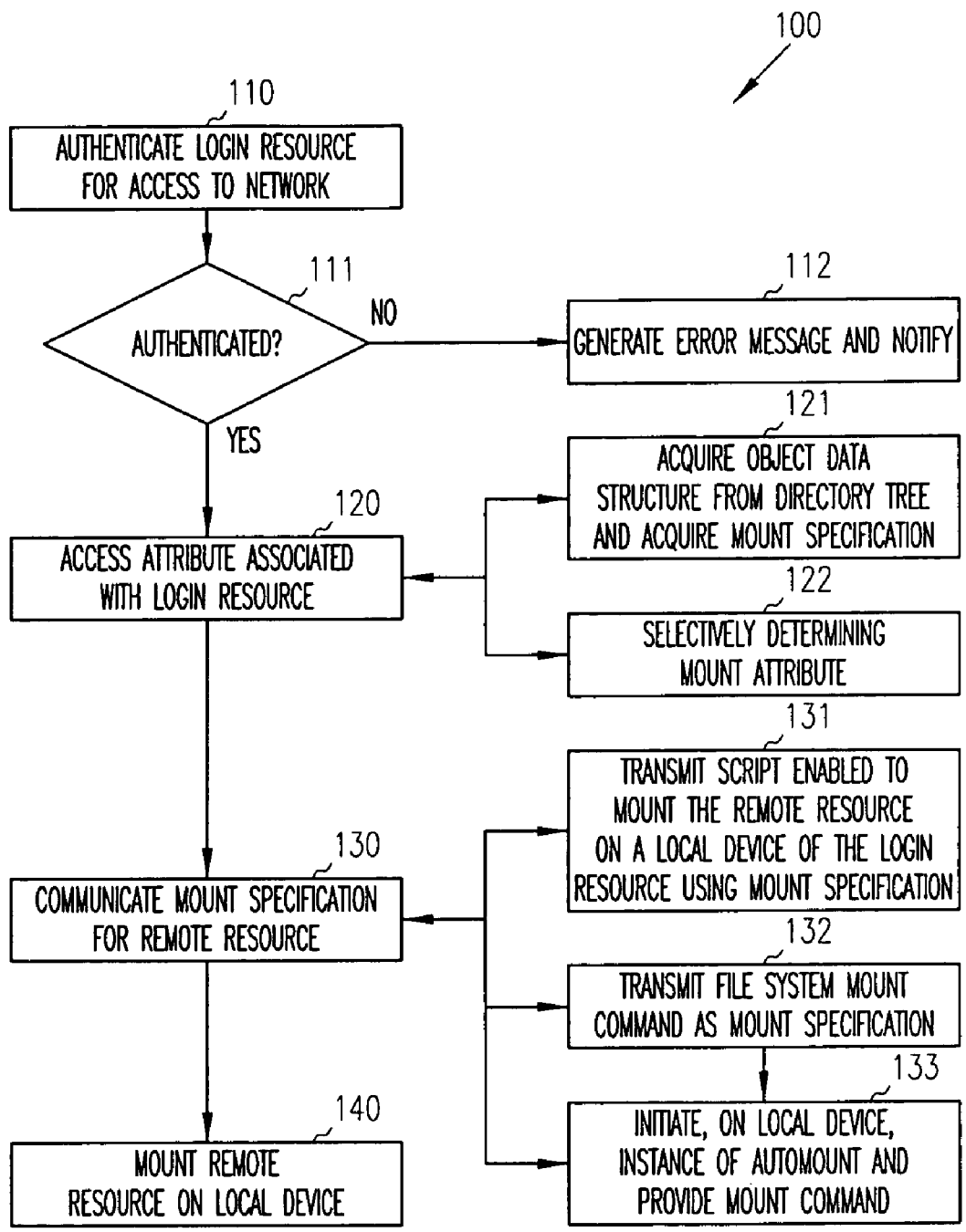
FIG. 1 is a diagram of a method for mounting a resource over a network, according to an example embodiment.

FIG. 1 is a diagram of a method 100 for mounting a resource over a network, according to an example embodiment. The method 100 (hereinafter "resource mounting service") is implemented in a machine-accessible and readable medium and is operational over a network. The network may be wired, wireless, or a combination of wired and wireless.

The processing of the resource mounting service occurs during a login resource's attempt to log into a network. For example, consider a login resource who is a user. The user connects his/her computer to a network and attempts to access the secure network associated with his employer. The computer may be docked inside the firewall of the secure network or the computer/laptop may be on the other side of the firewall and external to the secure network (e.g., the laptop may be undocked and traveling).

The processing of the resource mounting service occurs as an interface between the login resource and the network. In other words, the processing may be implemented within a firewall, proxy, server, or any other edge device or edge service of the network.

The login resource provides identifying information to the resource mounting service for purposes of authenticating itself, at 110, to the network. The identifying information may include an identifier and password pair, a digital certificate, one or more assertions, etc. Moreover, the identifying information may be directly supplied by the login resource or it may be indirectly supplied by the login resource via the login resource's local device or local services.

At 111, a check is made to determine if the supplied identifying information is legitimate. If the identifying information is not authenticated, then, at 112, an error message is generated and notification is sent back to the login resource that access to the network is not permissible.

However, if, at 111, the identifying information is authenticated, then a login resource profile or object data structure is acquired for the authenticated login resource. The resource object includes a variety of information about the login resource, such as, but no limited to, authentication mechanisms, identifying information, security permissions, group access permissions, etc. This information may be expressed or viewed as object attributes.

A special type of login resource attribute may be referred to as a "remote resource object attribute." The remote resource object attribute identifies a remote resource which is to be locally mounted on the device of the login resource during the login process. For example, the remote resource object attribute may include the location for acquiring a user's (login resource's) home directory (e.g., "/home/user_name" for LINUX or Unix operating systems). In another embodiment, the remote resource object attribute may be a pointer to a variable directory or temporary directory, such as "/var or /tmp." In still other embodiments, the remote resource object attribute may identify a particular device, such as a printer, or a particular service.

At 120, the resource mounting service accesses the remote resource object attribute for a successfully authenticated login resource. The processing at 120 may be automatically processed during a login session. Alternatively, the processing at 120 may be initiated by a separate process executing on a local device of the login resource.

For example, consider a modified or generic script installed and initiated via a login script and installed on the local device of the login resource. If the login resource successfully logs into the network, then an indication of such is detected by the login script and the generic script is invoked. The generic script then re-contacts the resource mounting service requesting the remote resource object attribute. Therefore, it should be noted that the processing depicted in FIG. 1 for the resource mounting service may be continuous or it may be invoked at different points by different independent processes, such as a generic script executing on a local device of a login resource.

In an embodiment, at 121, the resource mounting service accesses an object data structure, such as a directory tree to acquire a mount specification for the remote resource object attribute. The mount specification provides a location and technique for locally mounting a remote resource on a local device of the login resource.

In another embodiment, at 122, the remote resource object attribute may be selectively determined. For example, suppose that the mounting location for a resource varies depending upon the geographical location of a local device being used by the login resource. In this case, there may be a plurality of potential values for the remote resource object attribute for a given login resource. In an embodiment, the selection of a particular remote resource attribute may be determined based on an identity of the local device of the login resource, an identity associated with the login resource, and other information, such as sub-network Internet Protocol (IP) addresses associated with network hubs, servers, and/or routers that assist the login resource in communicating with the resource mounting service.

At 130, the resource mounting service communicates the mount specification associated with the remote resource object attribute to the login resource, the local device of the login resource, and/or a local service or script of the login resource.

In an embodiment, at 131, a mounting script or service that processes the mount specification on the local device of the login resource may also be dynamically pushed from the resource mounting service's environment to the local environment of the login resource and automatically processed thereon. In this manner, the login resource may be completely mobile and independent of any particular local device, since whatever local device the login resource may be using at any particular point in time can dynamically receive the mounting script and mounting specification for purposes of locally mounting remote resources.

In another embodiment, at 132, the resource mounting service supplies the mount specification as a resource mount command to a local service processing on a local device of the login resource. For example, in an embodiment, at 133, a local instance of automount may be initiated on the local device of the login resource and the mount command or mount specification provided in a format expected by the automount script or service. This results in the automount instance being dynamically supplied the mount specification from the resource mounting service and permits the remote resource to be locally mounted on the local device.

At 140, once the local device of the login resource has the mount specification, mount command, and a mounting service to process the information, the remote resource is locally mounted on the local device. At this point, the login resource may freely access the remote resource as if it were a local resource.

Conventionally, a local customized script or a local file that identified a remote service had to be installed on the local device of users in order to successfully mount a user's network directory (one type of remote resource). Or alternatively, the user had to manually enter the mounting request. These techniques are no longer needed with the teachings presented herein and above, because now a user (e.g., one type of login resource) may remotely acquire a mount specification during a login process and have that mount specification processed automatically, such that the user's home directory (e.g., one type of remote resource) is locally mounted on the user's local device. Thus, remote resources associated with users or other login resources may be centrally managed, controlled, and distributed from a single location. Consequently, changes to remote resources, such as changes in locations, may occur dynamically and without modifying information on a login resource's local device.

Figure 2:
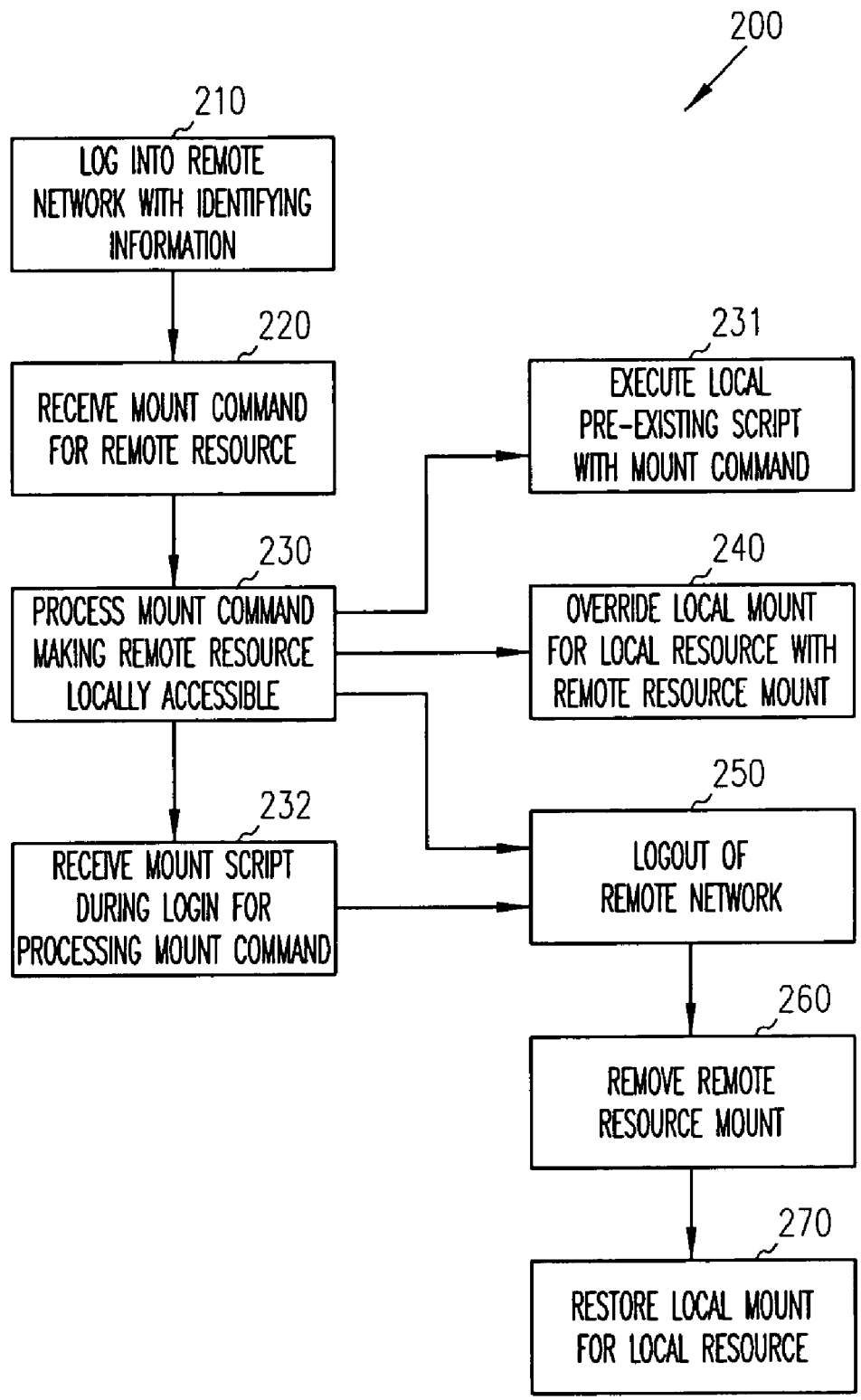
FIG. 2 is a diagram of another method for mounting a resource over a network, according to an example embodiment.

FIG. 2 is a flowchart of another method 200 for mounting a resource over a network, according to an example embodiment. The method 200 (hereinafter "local mounting service") is implemented in a machine-accessible and readable medium and is accessible over a network. The network may be wired, wireless, or a combination of wired and wireless. In an embodiment, the processing of the method 100 interacts with and interfaces to the processing of the method 200, such that the two services compliment one another to provide seamless remote mounting of resources within local environments of login resources.

At 210, a login resource accesses the local mounting service for purposes of logging into a remote network. This access may be achieved by executing a login script that the login resource accesses on startup of a local device or this may be achieved by the login resource directly invoking a login script for accessing the remote network. In an embodiment, the login script may be viewed as the local mounting service. Alternatively, the login script may interface with the local mounting service, such that the local mounting service is separate and distinct from the login script of the login resource. In some other embodiments, the local mounting service may be dynamically acquired, installed, and executed within the local environment of the login resource after some configurable portion of the login script executes.

The processing of FIG. 2 assumes that the login resource is successful in logging into the network by providing the proper identifying information. Although not shown in FIG. 2, if the login resource is not successful in logging into the network, then error messages are communicated back to the login resource and the processing is terminated.

At 220, during the login process, the local mounting service receives a mount command for a remote resource. The mount command may be dynamically pushed to the local mounting service from a remote mounting service, such as the remote mounting service represented as the method 100 of FIG. 1 during the login process. Alternatively, the mount command may be requested and received from the local mounting service after the login resource successfully logs into the network (e.g., pulled by the local mounting service).

At 230, the local mounting service processes the mount command, which makes the remote resource associated with the mount command locally accessible to the login resource within the local environment of the login resource. Essentially, the remote resource appears to be a local resource to the local device processing the local mounting service and interacting with the login resource.

In an embodiment, at 231, the mount command is processed by a pre-existing script or service installed on the local device of the login resource. This may be a modified version of the automount script, which is designed to interact with a remote mounting service, such as the remote mounting service represented by the method 100 of FIG. 1. The interaction is used to acquire the mount command and the modified version of the automount script processes the mount command to locally mount the remote resource.

In an alternative embodiment, at 232, the mount script or service is dynamically received during login from a remote mounting service, such as the remote mounting service represented by the method 100 of FIG. 1. Thus, the mount script and the mount command may both be dynamically received during login. This provides unique capabilities that would permit login resources to be independent of any particular device.

Once the remote resource is locally mounted, at 230, any existing local mount for a local resource may be overridden, at 240. For example, suppose the login resource is a user and the remote resource is a remote home directory for the user to use when connected to the network. The local home directory for the user is overridden once the remote home directory is mounted on the local device.

At 250, the login resource may normally or abnormally log out of the remote network. When this occurs the remote mount for the remote resource is removed, at 260, and the any local mount associated with a local resource that may have been overridden is restored, at 270.

The processing of the local mounting service demonstrates how a local device or service may be used to interact with a remote mounting service, such as the remote mounting service represented by the method 100 of FIG. 1 for purposes of automatically and locally mounting a remote resource within a local environment of a login service. The local mounting service may be implemented within the local environment and preconfigured to interact with the remote mounting service. Alternatively, in some arrangements, the entire processing associated with the local mounting service may be dynamically pushed, installed, and processed within a local environment of a login resource during a successful login of a login resource to a remote network.

Figure 3:
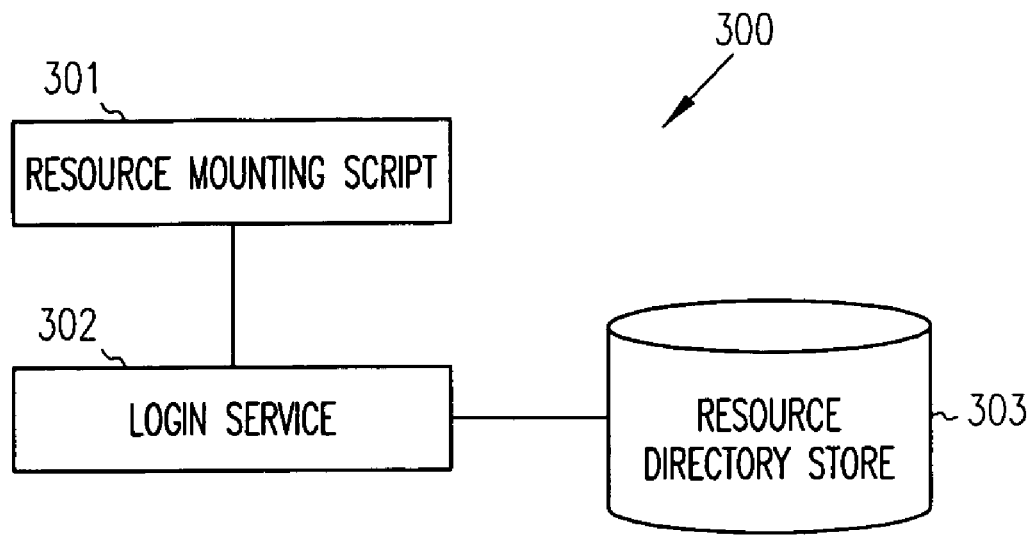
FIG. 3 is a diagram of a resource mounting system, according to an example embodiment.

FIG. 3 is a diagram of a resource mounting system 300, according to an example embodiment. The resource mounting system 300 is implemented in a machine-accessible and readable medium and is accessible over a network. The network may be wired, wireless, or a combination of wired and wireless. In an embodiment, the resource mounting system 300 implements, among other things, the methods 100 and 200 of FIGS. 1 and 2.

The resource mounting system 300 may be implemented entirely on a single device and partially dynamically pushed to other devices for execution as desired. Alternatively, the resource mounting system 300 may be partially implemented and distributed on a plurality of devices.

The resource mounting system 300 includes a resource mounting script 301 and a login service 302. In an embodiment, the resource mounting system 300 may also include a resource directory store 303.

The resource mounting script 301 interacts with the login service 302. The resource mounting script is responsible for locally mounting a remote resource to a login resource's local device or local environment. To do this, the resource mounting script 301 acquires a mounting command that identifies the location of the remote resource. In an embodiment, the resource mounting script 301 may be a modified version of an automount script. Alternatively, the resource mounting script 301 may be a generic script that acquires a mounting command for a remote resource on behalf of an unmodified automount script before the automount script is called upon to execute.

In an embodiment, the resource mounting script 301 is pre-installed or configured on a local device of login resource. In this embodiment, the resource mounting script is designed to contact and interact with the login service 302 for purposes of acquiring and processing a mounting specification or command for one or more remote resources associated with the login resource. In an alternative embodiment, the resource mounting script 301 is dynamically pushed and installed on a local device of a login resource once the login resource successfully logs into a network associated with the login service 302. In this embodiment, the login resource may utilize the teachings presented herein from any device that the login resource interacts with.

The login service 302 is adapted to authenticate a login resource for access to a secure network and to acquire a mounting specification for an authenticated login resource. The mounting specification defines how to make a remote resource locally accessible to a local device associated with the login resource. For example, the mounting specification may define a login resource's home directory by providing a pointer and protocol for accessing a remote home directory on the network. The remote home directory is the remote resource.

The remote resource may be a directory and/or a device. Moreover, the remote resource does not have to be exclusively associated with a login resource's network home directory. For example, the remote resource may be associated with a LINUX or UNIX "/var or /tmp" directory. Additionally, the remote resource may be associated with the identity of a remote device or remote service.

The login resource may be a user, a group of select users, a device, a service, and/or an application. Thus, the login resource does not exclusively have to be a user, although it can be.

In an embodiment, the resource mounting system 300 may also include a resource directory store 303. The resource directory store 303 is adapted to house resource objects, such as a login resource object that represents policies and attributes associated with a login resource.

In an embodiment, the resource directory store 303 is a database or directory tree having a plurality of user resource objects and each resource object including attributes. One attribute identifies a mounting specification for a remote resource. Thus, the resource mounting system 300 uses its login service 302 to acquire a resource object for a successfully logged in user resource and inspects its mount attribute for a mounting specification. The mounting specification may be translated to a mounting command and the mounting command dynamically supplied to the resource mounting script 301. The resource mounting script 301 processes the mounting command to make a remote resource locally accessible to a local device of the user.

In an embodiment, the mounting attribute or specification is adapted to be dynamically modified within the resource directory store 303 independent of the local device associated with the login resource object. In this manner, remote resources may be added, deleted, modified, or moved without impacting a specific device associated with a login resource. That is, the mounting specification is independent of any specific device of a login resource.

The resource mounting system 300 permits the decoupling of remote resource definitions from devices associated with login resources. This provides for improved administration and management of remote resources. Furthermore, with the resource mounting system 300 remote resources may exist independent of specific login resources; meaning that a login resource does not have to pre-exist before a remote resource may exist. This means that the logical association between login resources and remote resources may be created as soft logical mappings in a centralized location on a dynamic or as needed basis.

Figure 4:
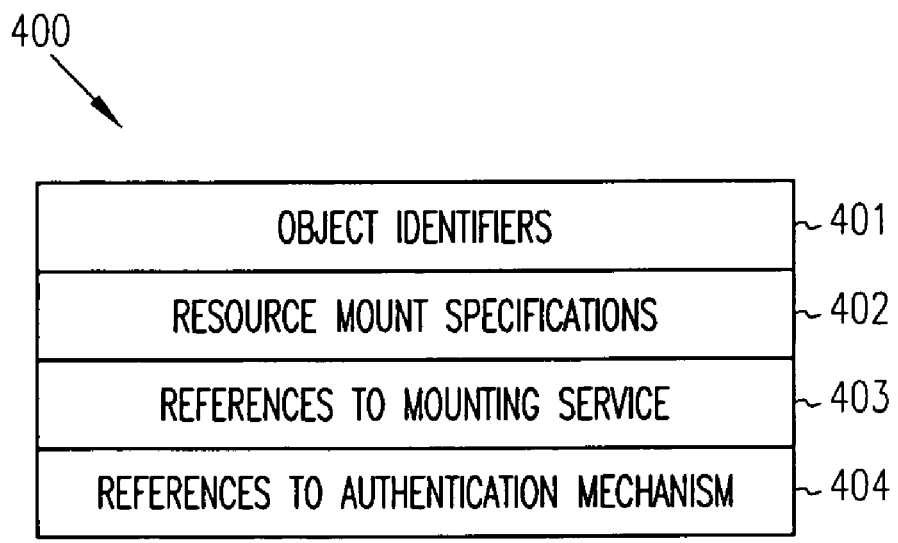
FIG. 4 is a diagram of a resource object data structure, according to an example embodiment.

FIG. 4 is a diagram of a resource object data structure 400, according to an example embodiment. The resource object data structure 400 is implemented in a machine-accessible or computer-readable medium and when processed within a machine permits a remote resource to be locally mounted to a machine associated with a login resource. The resource object data structure 400 does not have to be contiguously stored in one location. That is, the resource object data structure 400 may be logically and dynamically assembled from a variety of locations as needed.

In an embodiment, the resource object data structure 400 is consumed by the methods 100, 200, and the system 300 of FIGS. 1-3, respectively. The resource object data structure 400 provides a mechanism for centrally mapping and associating a login resource with one or more remote resources. A variety of other mechanisms may also be used to provide such a mapping, such as directory trees other arrangements within data stores, and the like. Thus, the resource object data structure 400 is presented for purposes of illustration and as one mechanism or arrangement for providing a mapping between login resources and their remote resources, which are to be locally mounted on the devices associated with the login resources when the login resources are authenticated and logged into a network.

The resource object data structure 400 includes object identifiers 401 and resource mount specifications 402. In some optional embodiments, the resource object data structure 400 may also include references to a mounting service 403 and/or references to an authentication mechanism 404. In an embodiment, the resource object data structure 400 is housed in a directory, a data store (e.g., database, data warehouse, etc.) and/or an electronic file.

The object identifiers 401 are adapted to uniquely identify login resources. Login resources include network users, devices, services, and/or automated applications. Each unique value for an object identifier 401 includes one or more resource mount specifications 402, zero or more references to a mounting service 403, and zero or more references to an authentication mechanism 404.

The resource mount specifications 402 are adapted to define where a specific remote resource is located and how to locally mount that remote resource. The resource mount specifications 402 may also be translated into a specific mount command which can be directly processed by a mounting service. The mounting service processes the mount command or the mount specifications 402 to locally mount a resource on a local device associated with a login resource. The mounting service may be dynamically pushed to and processed on a local device associated with the login resource. Alternatively, the mounting service may be preinstalled on the local device and adapted to receive the resource mount specification 402 for a particular login resource.

In an embodiment, the resource object data structure 400 may also include one or more references to the mounting service 403. That is, each unique value for an object identifier 401 may be associated with one or more references to mounting services 403. The references to the mounting services may also be linked to specific resource mounting specifications 402. In some cases, a login resource (identified by an object identifier 401) may have multiple remote resources that are to be locally mounted when the login resource successfully logs into a network. Each unique remote resource is associated with its own resource mount specification 402 and each resource mount specification 402 associated with perhaps different references to different mounting services 403. Thus, not only may resource mount specifications 402 be centrally managed and distributed but references to mounting services 403 may also be centrally managed and distributed through use of the resource object data structure 400.

In another embodiment, the resource object data structure 400 may include references to an authentication mechanism 404. This permits a customized login authentication technique to be uniquely associated to a specific login resource, which is identified by an object identifier 401. Moreover, in some cases, a remote resource may have an authentication procedure or policy; any such procedures or policies may be linked in the references to authentication mechanisms 404. Thus, the references to authentication mechanisms 404 may be associated with the initial login of a login resource or may be associated with any required login process associated with mounting a remote resource that has such security constraints.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and executed by a computer to perform the method, comprising:

authenticating a login resource for access to a network when the login resource logs into the network to access the network for starting up a local device of the login resource and for connecting the local device to the network;

automatically accessing an attribute associated with the login resource when the login resource is authenticated, the attribute is automatically accessed by a generic script on the local device that is initiated once the login resource is authenticated; and communicating a mount specification over the network for a remote resource to an environment of the login resource, when the login resource is authenticated based on identifying information directly supplied by the login resource, the mount specification communicated to the login resource, the local device, and a local script of the local device, and the mount specification is identified by the attribute, and the remote resource is automatically and dynamically mounted within the environment of the login resource as part of the login of the login resource into the network and achieved when the login resource logs into the network, a mounting location for the remote resource varies depending upon a geographical location for the local device and a specific location for acquiring the mount specification for the resource is selected based on the geographical location and an identity for the local device, the remote resource is automatically and dynamically mounted without a request from the login resource being made and as part of the login, the attribute also identifies the remote resource and the mount specification, and the remote resource is managed, controlled, and distributed from a single location and changes to the remote resource occur dynamically without modifying information on the local device of the login resource, and selection of the attribute determined based on the identity of the local device of the login resource, the identity associated with the login resource, and sub-network Internet Protocol (IP) addresses associated with network hubs, servers, and routers, the IP addresses used by the login resource for communicating with processing of remote resource mounting.

2. The method of claim 1, wherein accessing further includes acquiring an object data structure from a directory tree and inspecting an mount attribute for the mount specification.

3. The method of claim 1, wherein communicating further includes transmitting a file system mount command as the mount specification to the local device of the login resource.

4. The method of claim 3 further comprising, initiating by the processing associated with remote resource mounting, on the local device, an instance of an automount script and providing the instance with the file system mount command.

5. The method of claim 1 further comprising, mounting the remote resource on the local device of the login resource.

6. The method of claim 1, wherein communicating further includes transmitting the automount script enabled to mount the remote resource on the local device of the login resource using the mount specification.

7. A method implemented in a computer-readable storage medium and executed by a computer to perform the method, comprising:

logging into a remote network with identifying information on behalf of a user from a local device associated with the user, the identifying information directly supplied by the user during a login attempt;

receiving, during the login and as part of the login, a mount command for locally mounting a remote resource on the local device and in response to the identifying information supplied with the login, the user is already successfully logged into the remote network and the processing of remote resource mounting occurs in response to that successful login to the remote network, the user logged into the network to connect the local device to the remote network;

automatically processing the mount command on behalf of the user making the remote resource locally accessible, and the mount occurs automatically and dynamically as part of the login and the remote resource identified via an attribute associated with the user during the login, and a mounting location for which to mount the remote resource is selected based on a geographical location of the local device and an identity for the local device, and the remote resource is managed, controlled, and distributed from a single location and changes to the remote resource occur dynamically without modifying information on the local device of the user, the mount command is processed without the user request for the mount command, the mount command automatically processed in response to the login; and dynamically pushing and installing remote resource mounting to a local environment of the user after a successful login of the user occurs with the remote network.

8. The method of claim 7 further comprising, receiving a mounting script during the login, wherein the mount command is processed by the received mounting script.

9. The method of claim 7, wherein processing further includes executing a local pre-existing script with the mount command to make the remote resource locally accessible.

10. The method of claim 7 further comprising, overriding the local mount for a local resource with the remote resource after processing the mount command.

11. The method of claim 10 further comprising:
logging out of the remote network;
removing the remote resource; and
restoring the local mount for the local resource.

* * * * *